United States Patent Office 3,553,058
Patented Jan. 5, 1971

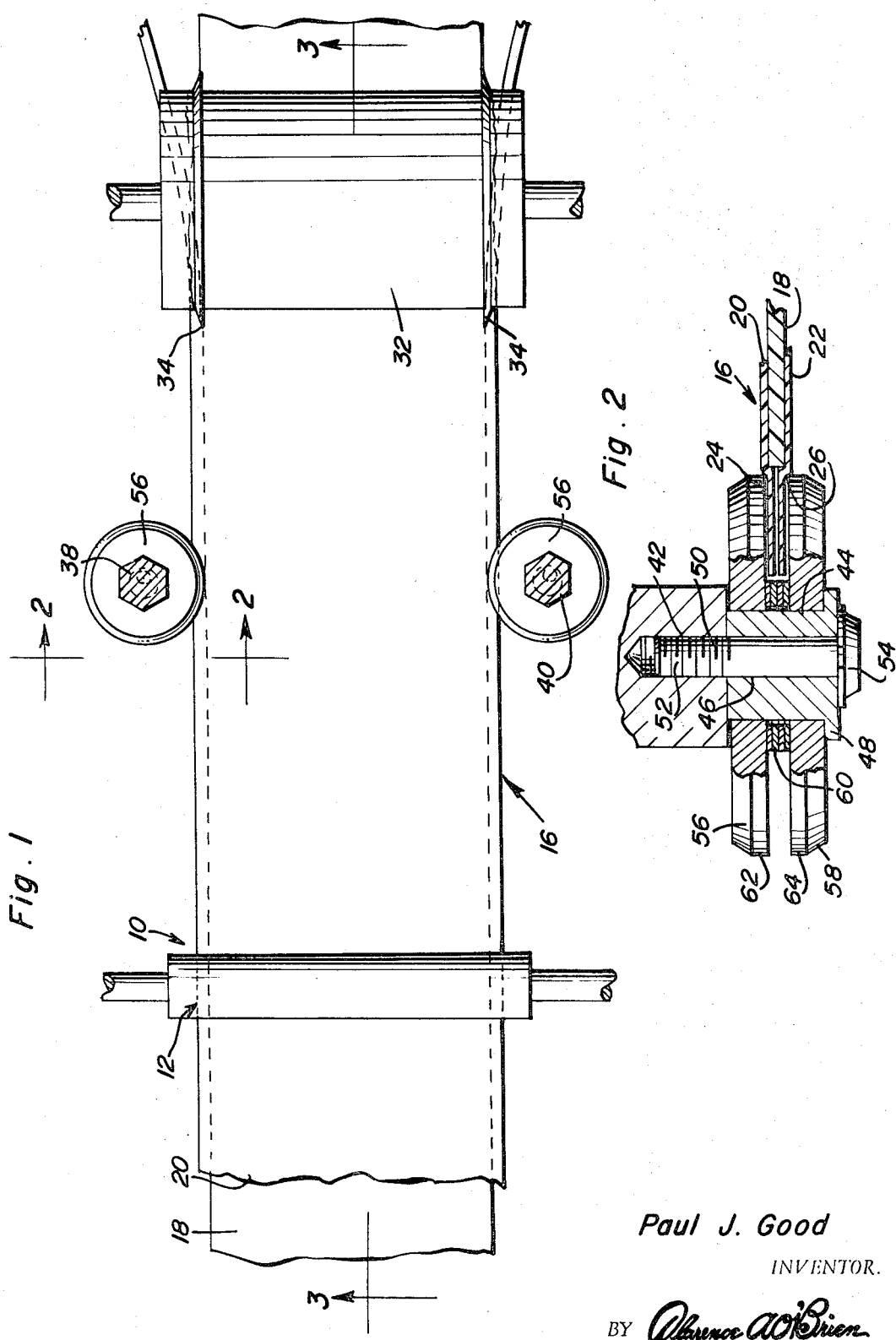

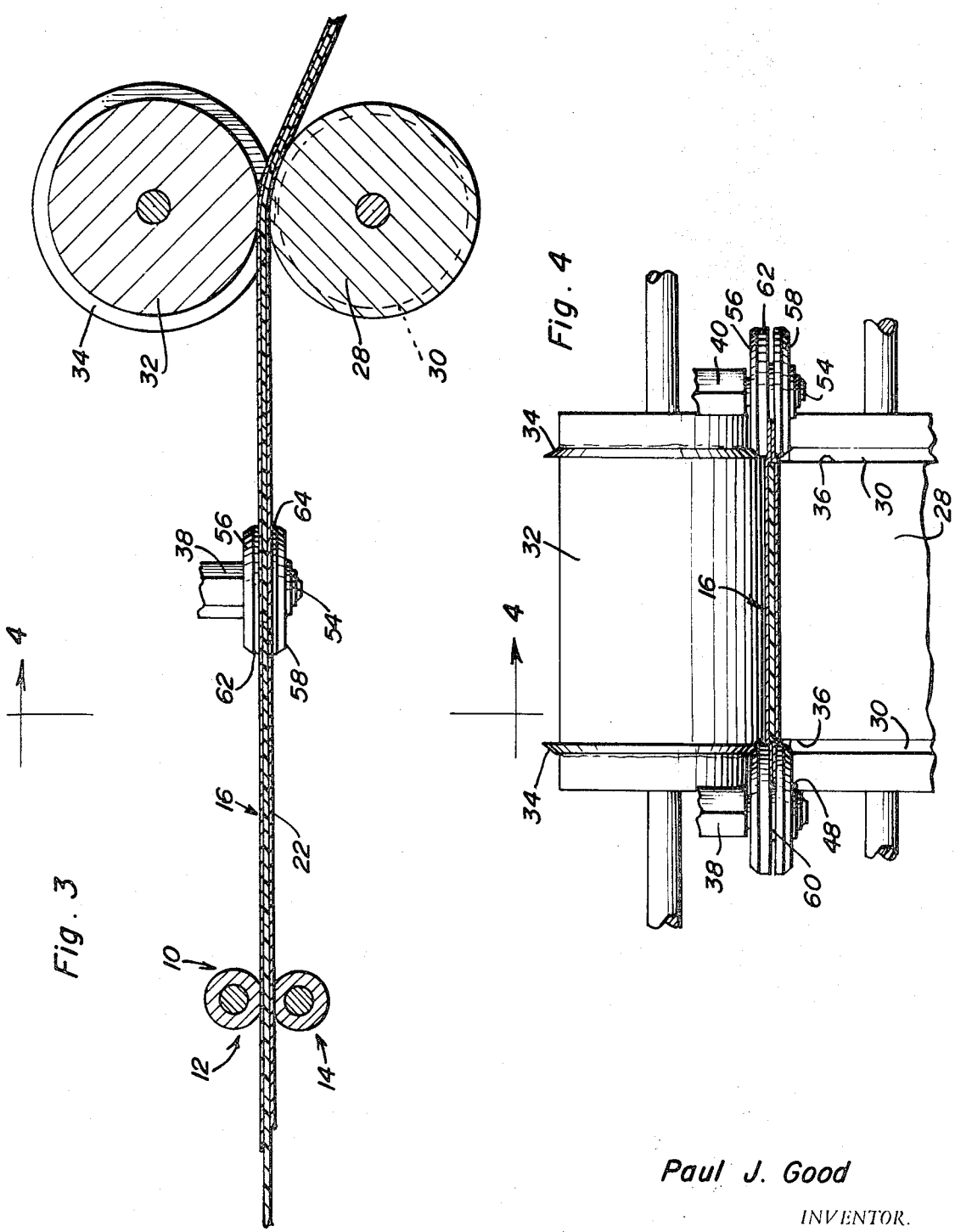

3,553,058
LAMINATED FILM GUIDE MECHANISM
Paul J. Good, Springwater, N.Y., assignor to D-S Industries, Inc., a corporation of New York
Filed Nov. 9, 1967, Ser. No. 681,767
Int. Cl. B32b *31/20;* B65h *17/44;* F16h *7/18*
U.S. Cl. 156—510          10 Claims

ABSTRACT OF THE DISCLOSURE

A guiding structure for use in trimming the side edge portions of an elongated panel assembly consisting of a center sheet laminated between upper and lower sheets of laminating material including opposite side edge portions extending outwardly of the side edges of the center sheet and pressed and secured tightly together so as to form, slightly outwardly of the side edges of the center sheet, upper and lower shoulders extending along and facing outwardly of both side edge portions of the panel assembly, the guide structure including opposing portions each consisting of a pair of axially spaced discs of equal diameter journalled for rotation from a suitable support member in a manner such that the axis of rotation of each pair of discs may be shifted along a path extending between the pairs of discs and the peripheral edges of each pair of discs being rollingly engaged with the corresponding shoulders with the adjacent extended edge portions of the upper and lower sheets of laminating material received between the discs of the corresponding pair of discs.

---

The guide mechanism of the instant invention is adapted to be positioned closely adjacent a cutting mechanism utilized to trim the portions of the upper and lower sheet of laminating material which project outwardly from the side edge portions of the center sheet of the panel assembly. The guide mechanism is of course adapted to be utilized in conjunction with a laminating machine capable of laminating the center sheet between the upper and lower sheets of laminating material. These laminating machines can be adjusted so as to be quite accurate in positioning the laminated sheets relative to the sheet which is to be laminated therebetween. However laminating machines are not so accurate so as to be capable of laminating a center sheet between upper and lower sheets of laminated material in a manner such that a constant amount of the edge portions of the upper and lower laminating sheets project outwardly beyond the side edges of the center sheet being laminated therebetween. Accordingly, when trimming the panel assembly consisting of the upper and lower laminating sheets and the center sheet laminated therebetween, a structure capable of sensing the exact amount of edge overlap of the laminating sheet at the side edge portion of the center sheet disposed between the laminating sheets must be provided in order that the panel assembly may be properly positioned in its advance toward an edge trimming assembly.

It is accordingly the main object of this invention to provide a guide mechanism which will be capable of accurately sensing not the side edge portions of the upper and lower sheet of laminating material of the panel assembly but the side edge portions of the center panel disposed between the upper and lower sheets of laminating material and guiding the panel assembly lengthwise toward a trimming assembly in a manner such that the panel assembly will be trimmed along the side edges of the center sheet.

Another object of this invention is to provide a guide mechanism which may be readily adjusted for trimming laminated panel assemblies of different widths.

Still another object of this invention is to provide a guide mechanism which may be readily adjusted for guiding panel assemblies of different thicknesses.

A final object of this invention to be specifically enumerated herein is to provide a laminated film guide mechanism which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a top plan view illustrating the film guide mechanism interposed between the full rolls of a laminating machine and a cylindrical cutting assembly including circumferentially extending and radially outwardly projecting slitter knives;

FIG. 2 is an enlarged fragmentary vertical sectional view taken substantially upon a plane indicated by section line 2—2 of FIG. 1;

FIG. 3 is an enlarged fragmentary vertical sectional view taken substantially upon a plane indicated by section line 3—3 of FIG. 1; and FIG. 4 is an enlarged fragmentary vertical sectional view taken substantially upon a plane indicated by section line 4—4 of FIG. 3.

Referring now more specifically to the drawings the numeral 10 generally designates a drive roller assembly including upper and lower roller structures 12 and 14 operable to frictionally receive therebetween an elongated panel assembly generally referred to by the reference numeral 16. The drive roller assembly 10 comprises a portion of the discharge end of a laminating machine of the type adapted to contiguously laminate a center sheet between upper and lower sheets of laminating material so as to form a panel assembly such as panel assembly 16. Conventionally, the center sheet 18 as well as an upper laminating sheet 20 and a lower laminating sheet 22 are handled by the laminating machine for sandwiching the center sheet 18 between the upper and lower sheets 20 and 22 with the upper and lower sheets 20 and 22 including opposite side edge portions projecting outwardly of the opposite side edges with the center sheet 18 and pressed and secured tightly together so as to form upper and lower shoulders 24 and 26 extending along and facing outwardly of both side edges of the panel assembly 16.

At least one of the roller structures 12 and 14 is driven so that the panel assembly 16 disposed between the roller structures 12 and 14 is longitudinally advanced toward the right as viewed in FIGS. 1 and 3 of the drawings.

A conventional form of trimming assembly includes a lower roller 28 including circumferential grooves 30 formed therein and suitably journalled in any convenient manner as well as an upper roller 32 including circumferentially extending and radially outwardly projecting slitter knives 34 which coact with the adjacent side edge portions 36 of the groove 30 to trim the opposite edge portions of the panel assembly 16 in a manner which will be obvious from FIGS. 1 and 2 of the drawings.

The guide mechanism of the instant invention includes a pair of horizontally spaced apart and stationarily positioned support members 38 and 40 which are supported from any suitable support structure (not shown) for horizontal shifting toward and away from each other. The support members 38 and 40 may be supported from the support structure for horizontal shifting in all directions if desired or supported from the support structure in fixed position relative to each other in a non-adjustable manner.

The support members 38, 40 have downwardly opening threaded blind bores 42 formed therein and the guide mechanism includes a pair of sleeve members 44 each provided with eccentrically located bores 46 formed longitudinally therethrough. The bores 46 are cylindrical as are the outer surface portions of the sleeve members 44 and each sleeve member 44 includes a hexagonal diametrically enlarged head portion 48 whereby the head portion end of each sleeve member 44 may be gripped by a suitable wrench.

A headed fastener and journal bolt 50 is provided for each of the sleeve members 44 and includes a shank portion 52 including a diametrically enlarged head 54 on one end. Each shank portion 52 is passed through and rotatably journals the corresponding sleeve member 44 and is threadedly engaged in the corresponding bore 42. A pair of guide discs 56 and 58 are provided for each sleeve member 44 and journalled thereon between the head portion 48 thereof and the opposing portion of the associated support member. A plurality of shim-like small diameter washers 60 are provided and disposed between the discs 56 and 58 of each pair of discs so as to maintain the latter in axially spaced apart relation.

The head 54 of each fastener or journal bolt 50 may be provided with any suitable means by which the bolt 50 may be tightened so as to clamp the corresponding sleeve member 44 between the head 54 of the bolt 50 and the corresponding support member. The combined axial thickness of each pair of discs 56 and 58 and the shim-like washers 60 is slightly less than the distance between the head portion 48 of each sleeve member 44 and the corresponding support member and if it is desired to lessen the distance between each pair of discs 56 and 58, it is merely necessary to remove the bolt 50, withdraw one or more of the shims 60 from between the discs 56 and 58 and position the withdrawn discs between the head portion 48 and the disc 58 thus maintaining the combined axial thickness of the discs 56 and 58 and the shims 60 slightly less than the distance between the head portion 48 and the corresponding support member.

The adjacent end portions of the discs 56 and 58 include cylindrical outer surface portions 62 and 64 against which the shoulders 24 and 26 of the corresponding edge portion of the panel assembly 16 are adapted to abut. In this manner, even though the extended edge portion of the upper and lower sheets 20 and 22 may project different distances outwardly of the center sheet 18 at points spaced longitudinally along the panel assembly 16, the guide mechanism disposed between the drive roller assembly 10 and the slitter assembly comprising the rollers 28 and 32 will be capable of laterally positioning the panel assembly 16 in a manner such that the slitter knives 34 trim the panel assembly 16 along the opposite edge portions of the center sheet 18.

Of course, the difference in radial extent between the shims 60 and the discs 56 and 58 must always exceed the amount the edge portions of the sheets 20 and 22 project outwardly of the side edges of the center sheet 18, In addition, the axial spacing between the discs 56 and 58 is adjusted in accordance with the thickness of the sheets 20 and 22 and it will be noted that the bores 46 are eccentrically located relative to the longitudinal center axes of the sleeve members 44 whereby the effective axes of rotation of each pair of discs 56 and 58 may be laterally shifted by loosening the bolts, rotatably adjusting the sleeve members 44 relative to the bolts 50 and then tightening the latter while maintaining the sleeve members 44 in adjusted rotated position.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an elongated panel assembly consisting of a center sheet laminated between upper and lower sheet of laminating material including opposite side edge portions projecting outwardly of the side edges of said center sheet pressed and secured tightly together so as to form, slightly outwardly of said centered sheet side edges, upper and lower shoulders extending along and facing outwardly of both side edges of said panel assembly, a guide mechanism including at least one pair of axially spaced discs of equal diameter journalled for rotation from a suitable support member, the axial spacing between said discs snugly receiving the projecting edge portions of said upper and lower sheets at the corresponding side edge portion of said panel assembly therebetween with the outer peripheral surface portions of said discs rollingly engaged with the corresponding shoulders, and means guidingly engaged with the other side edge portion of said panel assembly to prevent movement of said panel assembly laterally away from said discs.

2. The combination of claim 1 wherein said means adapted to guidingly engage the other side edge portion of said panel assembly comprises a second pair of axially spaced discs also journalled for rotation from a support member and rollingly engaged with said shoulders on the other side edge portion of said panel assembly.

3. The combination of claim 1 wherein said support member includes means for shifting the axis of rotation of said discs toward and away from said means adapted to guidingly engage the other side edge portion of said panel assembly.

4. The combination of claim 1 wherein said means adapted to guidingly engage the other side edge portion of said panel assembly comprises a second pair of axially spaced discs also journalled for rotation from a support member and rollingly engaged with said shoulders on the other side edge portion of said panel assembly, said support members include means for shifting the axes of rotation of said pairs of discs toward and away from each other.

5. The combination of claim 1 including a pair of journalled rollers positioned adjacent said guide mechanism and adapted to rollingly compressively receive said panel assembly therebetween, one of said rollers including a pair of circumferential grooves axially spaced apart a distance equaling the spacing between the opposite side edges of said center sheet, the other of said rollers including generally radially outwardly projecting and circumferentially extending blade portions disposed in shearing relation with the adjacent sides of said grooves.

6. The combination of claim 1 including a plurality of small diameter removable shim means disposed between each pair of discs providing the means by which said discs are maintained in axially spaced relation.

7. A guide mechanism for use in trimming the side edge portions of an elongated panel assembly consisting of a center sheet laminated between upper and lower sheet of laminating material including opposite side edge portions projecting outwardly of the side edges of said center sheet pressed and secured tightly together so as to form, slightly outwardly of said center sheet side edges, upper and lower shoulders extending along and facing outwardly of both side edges of said panel assembly, said guide mechanism including at least one pair of axially spaced discs of equal diameter journalled for rotation from a suitable support member, the axial spacing between said discs being adapted to snugly receive the projecting edge portions of said upper and lower sheets at the corresponding side edge portion of said panel assembly therebetween with the outer peripheral surface portions of said discs rollingly engaged with the corresponding shoulders, and means adapted guidingly engage the other side edge portion of said panel assembly to prevent movement of said panel assembly laterally away from said discs, said support member comprising a stationary cylindrical sleeve member mounted for adjustable positioning about an eccentrically disposed axis.

8. The combination of claim 7 including a pair of journalled rollers positioned adjacent said guide mechanism and adapted to rollingly compressively receive said panel assembly therebetween, one of said rollers including a pair of circumferential grooves axially spaced apart a distance adapted to equal the spacing between the opposite side edges of said center sheet, the other of said rollers including generally radially outwardly projecting and circumferentially extending blade portions disposed in shearing relation with the adjacent sides of said grooves.

9. The combination of claim 8 wherein said means adapted to guidingly engage the other side edge portion of said panel assembly comprises a second pair of axially spaced discs also journalled for rotation from a support member.

10. The combination of claim 9 wherein said support member includes means for shifting the axis of rotation of said discs toward and away from said means adapted to guidingly engage the other side edge portion of said panel assembly.

References Cited
UNITED STATES PATENTS

| | | | |
|---|---|---|---|
| 2,316,173 | 4/1943 | Kratz | 18—15 |
| 2,664,139 | 12/1953 | Speed et al. | 156—259X |
| 3,296,052 | 1/1967 | Bechtold | 156—202 |
| 3,399,816 | 9/1968 | Staklinski | 226—190X |

BENJAMIN A. BORCHELT, Primary Examiner

J. M. HANLEY, Assistant Examiner

U.S. Cl. X.R.

156—261, 467, 585; 226—168; 74—241